United States Patent [19]

Edelman et al.

[11] 3,952,084

[45] Apr. 20, 1976

[54] POLYIMIDE AND POLYAMIDE-IMIDE PRECURSORS PREPARED FROM ESTERS, DIANHYDRIDES, AND DIISOCYANATES

[75] Inventors: Leonard E. Edelman; William M. Alvino, both of Pittsburgh, Pa.

[73] Assignee: Westinghouse Electric Corporation, Pittsburgh, Pa.

[22] Filed: Oct. 22, 1974

[21] Appl. No.: 517,282

Related U.S. Application Data

[63] Continuation-in-part of Ser. No. 466,744, May 3, 1974, abandoned.

[52] U.S. Cl. .................. 260/77.5 AM; 252/182; 427/385; 427/388; 428/458; 428/474
[51] Int. Cl.$^2$................................. C08G 18/00
[58] Field of Search ............ 252/182; 260/77.5 AM; 427/385, 388; 428/458, 474

[56] References Cited
UNITED STATES PATENTS

| | | | |
|---|---|---|---|
| 3,300,420 | 1/1967 | Frey | 260/2.5 AM |
| 3,489,696 | 1/1970 | Miller | 260/2.5 AM |
| 3,493,540 | 2/1970 | Muller et al. | 260/47 |
| 3,505,295 | 4/1970 | Grunsteidl et al. | 260/77.5 |
| 3,551,383 | 12/1970 | Fang | 260/47 |
| 3,625,911 | 12/1971 | Redman et al. | 260/30.2 |
| 3,708,458 | 1/1973 | Alberino et al. | 260/65 |
| 3,853,813 | 12/1974 | Edelman et al. | 260/47 CB |

FOREIGN PATENTS OR APPLICATIONS

| | | | |
|---|---|---|---|
| 1,105,437 | 3/1968 | United Kingdom | 260/77.5 AM |

OTHER PUBLICATIONS

Meyers, *J. of Polymer Sci.*, Part 1-A, Vol. 7, 1969, pp. 2757-2762.
Carleton et al., *J. Applied Poly. Sci.*, Vol. 16, 1972, pp. 2983-2989.
Derwent Jap. Pat. Rept., 1967, 6, No. 2. Gp. 1, 12-3, (Abstract Jap. Pat. 676-7/67).

*Primary Examiner*—M. J. Welsh
*Attorney, Agent, or Firm*—R. D. Fuerle

[57] ABSTRACT

A solution is prepared of about 30 to about 60 mole percent of a mono-ester of a tricarboxylic anhydride or a diester of a tetracarboxylic acid and about 40 to about 70 mole percent of a dianhydride. An aromatic diisocyanate is added and the solution heated until the viscosity no longer increases. The precursor can be precipitated by the addition of a non-solvent, collected, and re-dissolved in a solvent. The solution of the precursor can be applied to a sheet and cured to form a polyimide or polyamide-imide film, or it can be applied to a wire and cured to form a polyimide or polyamide-imide wire enamel.

28 Claims, No Drawings

POLYIMIDE AND POLYAMIDE-IMIDE PRECURSORS PREPARED FROM ESTERS, DIANHYDRIDES, AND DIISOCYANATES

CROSS-REFERENCE TO RELATED APPLICATION

Priority of filing date is claimed based on application Ser. No. 466,744 filed May 3, 1974, now abandoned, of which this application is a continuation-in-part.

This application is related to application Ser. No. 363,771, filed May 24, 1973 by Leonard Edward Edelman and William Michael Alvino, titled "Composition and Method of Preparing Polyimide Precursor and Polyimide Therefrom," now U.S. Pat. No. 3,853,813, which describes the preparation of polyimides from dianhydrides, tetracarboxylic acids, and diisocyanates.

BACKGROUND OF THE INVENTION

In the commercial process for producing polyimides, such as those polyimides sold under the trademark "Kapton" by the Dupont Co., a dianhydride is reacted with a diamine to form an intermediate polyamic acid. The polyamic acid is then spread on a substrate and cured to form the polyimide. For example, the reaction of pyromellitic dianhydride with 4,4'-diamino diphenyl ether to produce a polyamic acid is:

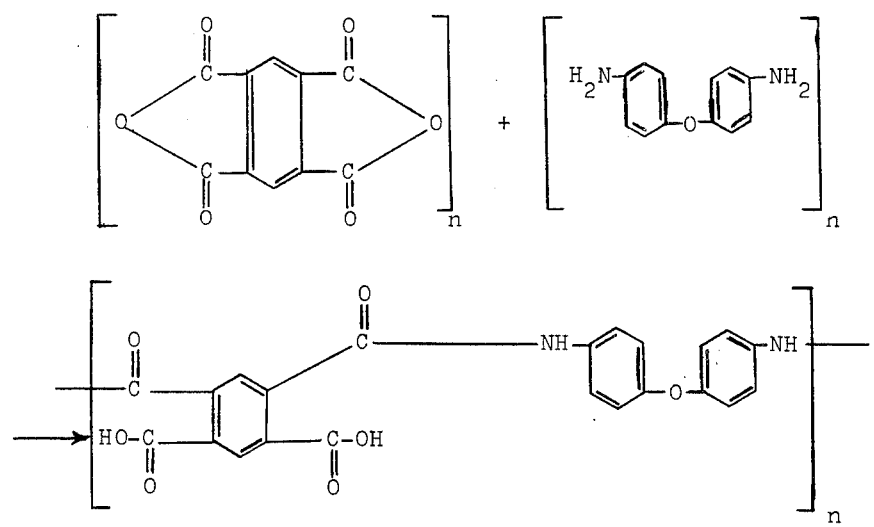

The polyamic acid cures to form the polyimide and two moles of water.

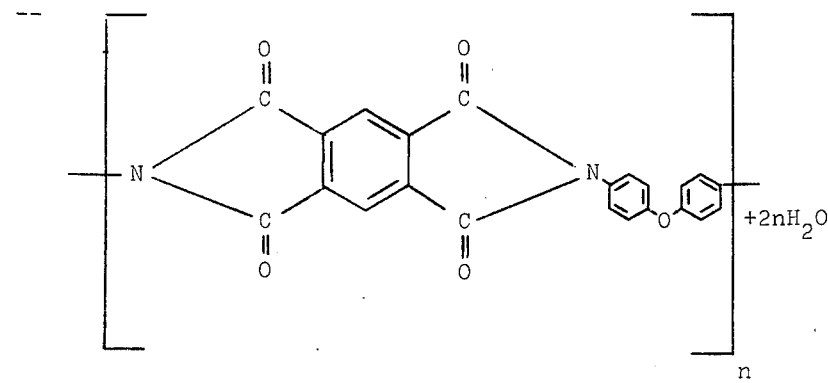

The moles of water of condensation given off during the cure creates processing difficulties since it can produce bubbles or blisters in the film as it evaporates.

Also, when the polyamic-acid is stored, some water is formed by closure of the imide ring as during cure. This water then attacks the polymer at another position along the chain which degrades the polymer and reduces its molecular weight. For this reason it is recommended tht the polyamic-acid be refrigerated during storage.

PRIOR ART

In British Pat. No. 1,105,437 a tetracarboxylic acid, a diisocyanate, and a smal amount of a dianhydride are reacted in a solvent to produce an insoluble precipitant.

Attempts to prepare polyimides from a dianhydride and a diisocyanate are described in an article by R. A. Meyers in the *Journal of Polymer Science*, Part A-1, Volume 7, pages 2757 to 2762 (1969) and in an article by Peter A. Carleton et al. in the *Journal of Applied Polymer Science*, Volume 16, pages 2983 to 2989 (1972).

U.S. Pat. No. 3,708,458 describes low molecular weight copolyimides of benzophenone tetracarboxylic dianhydride and mixtures of diisocyanates.

Japanese patent 676–7/67 describes the reaction of dimethyl dihydrogen pyromellitate with diphenyl methane diisocyanate in dimethyl formamide.

The reaction of TMA and a diisocyanate is known in the prior art. See U.S. Pat. Nos. 3,625,911, 3,562,217, 3,578,639 and 3,592,789.

SUMMARY OF THE INVENTION

We have discovered that if a dianhydride and an ester are mixed in the proportion of about 40 to about 70 mole percent dianhydride to about 30 to about 60 mole percent ester, they can react with an aromatic diisocyanate to produce a soluble polyimide precursor which can be cured to form a polyimide.

The principal advantage of the process of this invention over the present commercial process for preparing polyimides is the elimination of water of condensation during cure. Therefore, the hereinbefore-discussed problems of blistering, bubbling, and storage stability are eliminated. The infrared spectrum and the properties of the polyimides of this invention indicate that they are identical to the polyimides prepared from the present commercial process using the same dianhydride and the diamine corresponding to the diisocyanate.

The process of this invention also has several advantages over the process of the cross-referenced application Ser. No. 363,771, filed May 24, 1973 now aU.S. Pat. No. 3,853,813. First, the preferred procedure of precipitation and re-dissolution of the precursor permits the formation of a solution of higher solids content. A high solids solution wastes less solvent on cure and allows a higher build-up in one pass.

Second, the use of esters instead of a tetracarboxylic acid means that an alcohol and carbon dioxide are eliminated during cure rather than water and carbon dioxide. It is generally easier to remove an alcohol than water since the lower alkyl alcohols usually used have lower heats of vaporization and are therefore more volatile.

Finally, the reaction is easier to control because the ester has less functionality than its tetracarboxylic acid. When a tetracarboxylic acid is used it can react with the diisocyanate at a low temperature (10°C) which uses up most of the diisocyanate, leaving an insufficient amount remaining to react with the dianhydride. (At higher temperatures the diisocyanate reacts more equally with both the dianhydride and the tetracarboxylic acid.) This difficulty is avoided when the ester is used instead of the tetracarboxylic acid.

DESCRIPTION OF THE INVENTION

Dianhydrides

The dianhydrides of this invention include dianhydrides of the general formula:

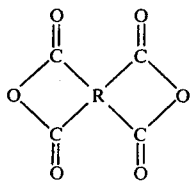

where R is a tetravalent radical which consists of at least two carbon atoms and may be a substituted or non-substituted aromatic group, a substituted or non-substituted aliphatic group, a substituted or non-substituted cycloaliphatic group, or a substituted or non-substituted heterocyclic group which contains at least one of the atoms N, O, or S, or different radicals which are bonded directly or by means of one of the following radicals: alkylene, dioxyalkylene, arylene, —SO₂—, —O—, —CO—,

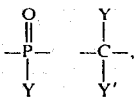

—NY—CO—X—CO—NY—, —CO—NY—X—NY—CO—, —CO—O—X—O—CO—, —O—CO—X—CO—O—, and —CO—NY—NY—CO—, where X is a bivalent alkylene radical, dioxyalkylene radical, or arylene radical, and Y and Y' are alkyl radicals, aryl radicals, or cycloaliphatic radicals. The dianhydride is a carbonylated compound capable of forming an internal diimide which has two pairs of carbonylated groups, whereby each of said groups is bonded at one side to a carbon atom of a single tetravalent radical and at the other side to an oxygen atom, while the carbonylated groups, which belong to a single pair, are separated by three carbon atoms at most.

While non-aromatic dianhydrides such as tetrahydrofuran tetracarboxylic dianhydride (THFDA), cyclopentane tetracarboxylic dianhydride, or bicyclo-[2,2,2]-octen-(7)-2,3,5,6-tetracarboxylic-2,3:5,6-dianhydride may be used, aromatic dianhydrides are preferred as they produce polyimides with far superior heat resistance. Examples of suitable aromatic dianhydrides include:

pyromellitic dianhydride (PMDA)
2,3,6,7-naphthalene tetracarboxylic dianhydride
3,3',4,4'-diphenyl tetracarboxylic dianhydride
1,4,5,8-naphthalene tetracarboxylic dianhydride
1,2,5,6-naphthalene tetracarboxylic dianhydride
bis (3,4-dicarboxyphenyl) sulfone dianhydride
perylene 3,4,9,10-tetracarboxylic dianhydride
bis (3,4-dicarboxyphenyl) ether dianhydride
ethylene tetracarboxylic acid dianhydride
cyclopentadienyl tetracarboxylic acid dianhydride
3,4,3',4'-benzophenone tetracarboxylic acid dianhydride (BTDA)
bis (3,4'-dicarboxyphenyl) 2,5-oxadiazole-1,3,4 dianhydride
bis (3',4'-dicarboxyphenyl oxadiazole-1,3,4) paraphenylene dianhydride
(3',4'-dicarboxyphenyl) 2-dicarboxy 5,6-benzimidazole dianhydride
(3',4'-dicarboxyphenyl) 2-dicarboxy 5,6-benzoxazole dianhydride
(3',4'-dicarboxyphenyl) 2-dicarboxy 5,6-benzothiazole dianhydride
bis (3',4'-dicarboxydiphenylether) 2,5-oxadiazole 1,3,4 dianhydride The preferred dianhydride is pyromellitic dianhydride (PMDA) because it produces the toughest and most heat-resistant polyimides and the most flexible polyimide films. Mixtures of dianhydrides are also comtemplated.

THE ESTERS

The esters are cyclic compounds which are monoesters of tricarboxylic acids or diesters of tetracarboxylic acids. Aromatic esters are preferred as they have better heat stability but non-aromatic esters may also be used. Each ester group must be in a position which is vicinal to a carboxylic acid group in order to form an imide structure during cure. In a diester, each ester group should have its own carboxylic acid group on the ring and should not be vicinal to the carboxylic acid group which is vicinal to the other ester group.

The ester group can be alkyl, alkylene, acetylenic, or aryl, branched or unbranched from $C_1$ to $C_{12}$. The ester groups need not be the same in a particular diester and mixtures of different diesters or mixtures of diesters and mono-esters may also be used. Alkyl groups from $C_1$ to $C_4$ are preferred for the ester group since during cure they form low-molecular weight alcohols which are easily driven off.

Ester groups of alkyl from $C_5$ to $C_{12}$ may be useful as plasticizers which flexibilize the polyimide. They could perform this function by preventing the imide ring from closing during cure (thus forming a polyester-imide or a polyester-amide-imide) or by not being volatilized during cure.

The esters are most easily made by reacting an alcohol with a dianhydride (to prepare a diester) or a mono-anhydride of a tricarboxylic acid (to prepare a mono-ester) according to the reaction:

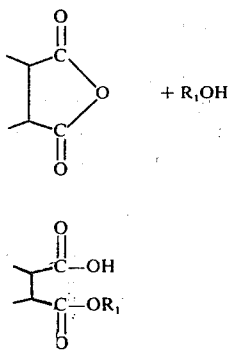

Position isomers may be formed, depending on the particular anhydride used. The advantage of the above reaction is that it forms the ester with a carboxylic acid group vicinal to each ester group. In the reaction enough alcohol is used to dissolve the dianhydride, typically about 2 to about 5 times the weight of the dianhydride. For alcohols higher than about $C_5$ a stoichiometric amount of alcohol should be used in order to avoid the formation of tri- and tetra-esters. The alcohol and dianhydride are heated at reflux until all the anhydride is in solution, then for an additional 15 to 20 minutes. The mixture is cooled to room temperature which causes the ester to precipitate. The precipitate is then collected and dried. Other methods of preparing the ester may also be used.

The production of relatively pure diesters of certain dianhydrides, for example BTDA, may entail certain difficulties due to the formation of some triester which is difficult to separate from the diester. However, these difficulties are surmountable by standard laboratory purification techniques or by varying the reaction conditions.

Examples of dianhydrides which can be used to form the diester include the dianhydrides previously listed. PMDA is particularly preferred because its ester can be easily prepared and it reacts easily to form the polyimide. However, the polymerization reaction should occur with any of the above-described diesters.

Examples of tricarboxylic monoanhydrides which can be used to form the mono-ester include:
trimellitic monoanhydride
2,3,6-naphthalene tricarboxylic 2,3-monoanhydride
3,4,4'-diphenyl tricarboxylic 3,4-monoanhydride
1,8,4-naphthalene tricarboxylic 1,8-monoanhydride
1,2,5-naphthalene tricarboxylic 1,2-monoanhydride
3,4,3'-diphenyl sulphone tricarboxylic 3,4-monoanhydride
3,4,9-perylene tricarboxylic 3,4-monoanhydride
3,4,4'-diphenyl ether tricarboxylic 3,4-monoanhydride tricarballitic monoanhydride
1,2,4-cyclopentadienyl tricarboxylic 1,2-monoanhydride
3,4,4'-benzophenone tricarboxylic 3,4-monoanhydride
2-(3',4'-dicarboxy phenyl) 5-(3 -carboxy phenyl) 1,3,4-oxadiazole 3',4'-monoanhydride
2-(3',4'-dicarboxy phenyl) 5-carboxy benzimidazole 3',4'-monoanhydride
2-(3',4'-dicarboxy phenyl) 5-carboxy benzoxazole 3',4'-monoanhydride
2-(3',4'-dicarboxy phenyl) 5-carboxy benzothiazole 3,4'-monanhydride
2-(3',4'-dicarboxy diph enylether) 5-(4''-carboxy diphenylether) 1,3,4-oxadiazole 3',4'-monoanhydride (the diphenylether group being the group $C_6H_5—O—C_6H_4—$).

Trimellitic anhydride is preferred as it is readily available and low cost. A diester is preferred to a mono-ester if maximum heat-resistance is desired. However, if heat-resistance is not important, a mono-ester is preferred as it is less expensive.

AROMATIC DIISOCYANATE

The diisocyanate is an aromatic compound having two —NCO groups. Only aromatic compounds are used as aliphatics do not produce polyimides of sufficient heat resistance. The following are examples of suitable diisocyanates:
4,4'-diisocyanato diphenyl 2,2-propane
4,4'-diisocyanato diphenyl methane
4,4'-diisocyanato benzidine
4,4'-diisocyanato diphenyl sulfur
4,4'-diisocyanato diphenyl sulfone
4,4'-diisocyanato diphenyl ether
4,4'-diisocyanato diphenyl 1,1-cyclohexane
oxides of methyl- and of bis (meta-isocyanato-phenyl) phosphine
diisocyanato 1,5-naphthalene
meta-phenylene diisocyanate
toluylene diisocyanate
dimethyl 3,3'-diisocyanato 4,4'-diphenylene
dimethoxy 3,3'-diisocyanato 4,4'-diphenylene
meta-xylylene diisocyanate
para-xylylene diisocyanate
diisocyanato 4,4'-dicyclohexyl methane
hexamethylene diisocyanate
dodeca-methlene diisocyanate
diisocyanato-2,11-dodecane
bis (para-phenylene isocyanate oxadiazole-1,3,4) para-phenylene
bis (para-phenylene isocyanate) oxadiazole-1,3,4
bis (meta-phenylene isocyanate) oxadiazole-1,3,4
bis (meta-phenylene isocyanate) 4-phenyl triazole-1,2,4
bis (4-paraphenylene isocyanate thiazole 2-yl) meta-phenylene
(2-phenylene) benzimidazole 5,4'-diisocyanate
(2-phenylene) benzoxazole 5,4'-diisocyanate
(2-phenylene) benzothiazole 6,4'-diisocyanate
bis (2-phenylene isocyanate benzimidazole 6-yl) 2,5-oxadiazole-1,3,4 bis (para-phenylene isocyanate 2-benzimidozole 6-yl)

bis (para-phenylene isocyanate 2-benzoxazole 6-yl)

The preferred diisocyanate for producing a polyimide of maximum heat resistance is p,p'-diisocyanatodiphenylether. The preferred diisocyanate for producing a polyimide of good heat resistance, but at a lower cost is p,p'-diisocyanatodiphenylmethane (MDI). Mixtures of diisocyanates are also comtemplated.

SOLVENT

The solvent used in preparing the precursor is a solvent for the dianhydride, the ester, the diisocyanate, and the resulting polyimide precursor. The solvent, of course, must be inert to the reactants. Examples of suitable solvents include dimethylacetamide, N-methyl pyrrolidone (NMP), and dimethyl formamide (DMF). The preferred solvent is N-methyl pyrrolidone as it is less toxic than many of the other solvents. Also, it has a high boiling point which means that it evaporates slowly during cure which gives the polymer a chance to flow into the voids it leaves and therefore avoids blisters and craters.

THE PROCESS

A mixture is prepared of about 30 to about 60 mole percent of the ester, about 40 to about 70 mole percent of the dianhydride, and sufficient solvent to make a solution of about 5 to about 25% solids, and preferably about 18 to about 22% solids (all percentages herein are by weight unless otherwise specified). The proportions given are to be regarded as critical since, if less than 40% dianhydride is used low molecular weight polymers are formed which have little utility, and if more than 70% dianhydride is used the polymers are insoluble and again have little utility.

Once the ester and dianhydride have been dissolved the diisocyanate is added. Alternatively, the diisocyanate can be dissolved in the solvent and a mixture of the ester and dianhydride can be added to the solution. In order to prevent the diisocyanate from reacting preferentially with either the ester or the dianhydride, the diisocyanate should contact a mixture of both the ester and dianhydride. At higher dianhydride percentages (70 mole percent the diisocyanate should be added slowly to avoid gellation. The amount of diisocyanate should be within about 5 mole percent of stoichiometric and a stoichiometric is preferred to non-stoichiometric amounts.

About 0.1% to about 1% of a catalyst is preferably included in the composition. Suitable catalysts include tin salts such as stannous octoate and tertiary amines such as triethyl amine and benzyldimethyl amine; the preferred catalyst is benzyldimethylamine.

The composition is heated until the viscosity no longer increases, which typically requires about 1 to 5 hours. A cessation of carbon dioxide evolution also occurs but may not be readily observable. The reaction temperature depends somewhat on the length of the ester group, longer groups requiring lower temperatures in order to avoid side reactions and the formation of insoluble precursors. Methyl esters, for example, can be reacted at about 25° to about 60°C, if a diester is used, while butyl esters should be held to about 25° to about 40°C. Methyl esters of a tricarboxylic anhydride, however, can be reacted at about 70° to about 90°C. Lower temperatures can be used, of course, but they require a longer reaction time.

The composition may be cooled to room temperature upon completion of the reaction. In order to separate the precursor from deleterious contaminates which may be present, the precursor is precipitated by the addition of a non-solvent. Suitable non-solvents include most alcohols and ketones. About 10 to about 100% by volume nonsolvent may be used in the precipitation. The precursor is collected, dried, and stored until needed.

The precursor may be used by dissolving it in a solvent, such as those previously described, to form a solution of about 18 to about 30% solids. To form a film the precursor solution is spread on a substrate, such as a sheet of aluminum, and is cured as the sheet passes through an oven. Typical films are about ½ to about 4 mils thick. The precursor solution may be used as a wire enamel by passing a wire through it prior to cure. Also, paper or a fabric can be coated with the precursor solution then cured to form an insulating sheet. The sheet or the film can be cut for use as electrical insulation, slot liners, etc.

The cure is typically done at about 100 to about 325°C for about ¼ to about 3 hours and preferably at about 275° to about 300°C for about 30 to about 45 minutes.

In the formation of the precursor and polyimide, the following reactions are believed to occur. The ester reacts with the diisocyanates to form a mixed carbamic acid-anhydride ester which is part of the precursor:

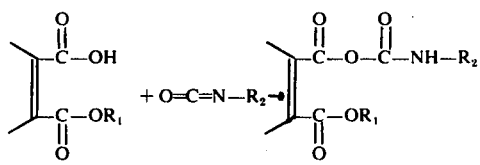

Two mixed carbamic acid-anhydride esters then react to form a mixed anhydride-ester and a urea compound:

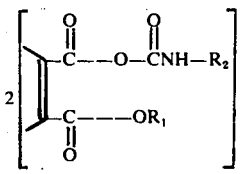

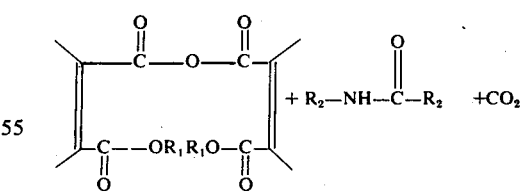

The mixed anhydride-ester and the urea compound then ungergo further reaction with a loss of carbon dioxide to form an amic-acid ester:

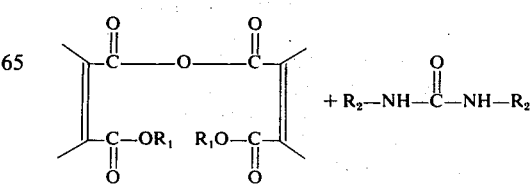

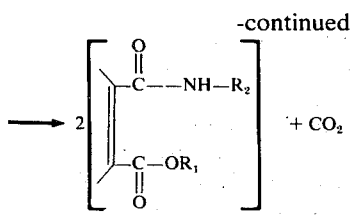

During cure the amic-acid ester forms the imide and an alcohol:

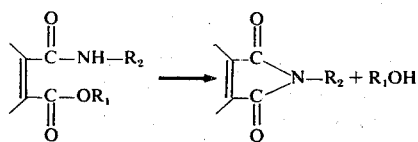

In forming the precursor the dianhydride is believed to react with the diisocyanate to form a 7-membered ring structure:

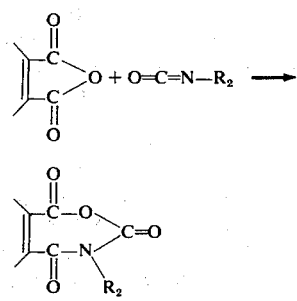

During cure the 7-membered ring forms the imide:

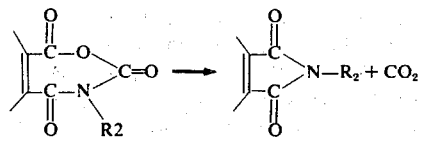

If a mono-ester of a tricarboxylic anhydride is used the carboxyl group reacts with the isocyanate group to form an amide linkage:

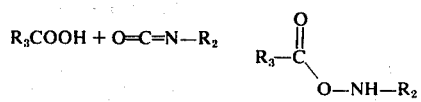

If a diester is used the precursor is believed to be composed of a mixture of mixed carbamic acid-anhydride ester, mixed anhydride-ester, urea compound, amic-acid ester, 7-membered ring structure, and some polyimide.

If a mono-ester is used the precursor is believed to also contain structure having amide linkages.

The following examples further illustrate this invention.

EXAMPLE 1

Preparation of Dimethyl Pyromellitate (DMPM)

Three-hundred grams of PMDA were dissolved in 800 gms of methyl alcohol (acetone-free containing 0.016% $H_2O$). The solution was refluxed for 2 hours. On cooling, 65 gms of a white solid melting at 235°–240°C was obtained by filtration. The wide melting point is expected as two isomers would result from this reaction. Subsequent amounts of product were obtained by evaporation of more solvent and filtration. By alkali titration, the equivalent weight was 139 compared to a calculated value of 141 for DMPM.

PREPARATION OF THE PRECURSOR

In general, these reactions were carried out by dissolving PMDA and the above-prepared DMPM in sufficient N-methyl pyrrolidone to provide a final solids content of 18–19%, correcting for the calculated loss of carbon dioxide. A stoichiometric amount of MDI was then added and the reaction run at 30° to 35°C while controlling the rate of $CO_2$ evolution until the viscosity began to rise. The temperature was then increased to about 60°C until the maximum viscosity was reached and $CO_2$ evolution ceased. In all cases, 10 drops of benzyldimethylamine (BDMA) per tenth mole batch was used as catalyst.

Table I shows a series of reactions in which the ratio of PMDA to the dimethyl ester was varied. The reactions, all run at 50°–60°C, show that the optimum ratio lies in the range of 40–60% PMDA. Above this percentage, gelation occurs and below, high molecular weight polymer do not result.

TABLE I

EFFECT OF RATIO OF PMDA TO DMPM ON VISCOSITY

| Mole % PMDA | Mole % DMPM | Gardner-Holdt Viscosity[1] | Inherent Viscosity (dl/gm) |
|---|---|---|---|
| 70 | 30 | Gelled | — |
| 60 | 40 | Z-1 | 0.80 |
| 50 | 50 | X-1 | 0.60 |
| 30 | 70 | G-H | 0.31 |
| 0 | 100 | A | — |

The above experiment was repeated except that the MDI was added slowly over a 1 ½ hour period. Table II gives the results:

TABLE II

| Mole % PMDA | Mole % DMPM | Gardner-Holdt Viscosity | % Solids Used for Gardner-Holdt Viscosity Measurement | Inherent Viscosity (dl/gm) |
|---|---|---|---|---|
| 40 | 60 | L | 19 | 0.40 |
| 50 | 50 | Z2 | 14.5[1] | 1.06 |
| 60 | 40 | — | 17 | — |
| 60 | 40 | A | 10 | 0.3 |
| 60 | 40 | F | 15 | 0.46 |
| 60 | 40 | Z | 11[1] | 1.55 |
| 70 | 30 | Z1+ | 19 | 0.73 |
| 80 | 20 | gel | 19 | — |

[1]solution made at 19% solids.

Table II shows that a soluble precursor can be obtained at 70 mole percent PMDA — 30 mole percent DMPM provided that the MDI is added slowly.

Table III shows the effect of temperature on a similar precursor preparation reaction using 50 mole percent PMDA and 50 mole percent DMPM with MDI. The Table shows that a temperature of 75°C produced an insoluble product while lower temperatures did not. Also, the addition of the MDI at a low temperature (5° to 10°C) did not produce an insoluble product as it does when the precursor is prepared from a tetracarboxylic acid instead of diester. (See Ser. No. 363,771, filed May 24, 1973 now U.S. Pat. No. 3,853,813).

TABLE III

EFFECT OF TEMPERATURE ON PRECURSOR REACTION

| Temperature of Addition of MDI (°C.) | Temperature of Reaction (°C.) | Time of Reaction (hrs.) | Gardner-Holdt Viscosity |
|---|---|---|---|
| 5°–10 | 50°–60 | 1½ | W-X |
| 35 | 35 | 5 | X |
| 50°–60 | 50°–60 | 1½ | X-Y |
| 75 | 75 | ⅓ | Gelled |

Preparation of the Polyimide

In spite of the fact that solutions of high inherent viscosity were produced, during cure the film became brittle and broke up and therefore flexible films could not be produced directly.

A precursor of 60 mole percent PMDA-40 mole percent DMPM and MDI prepared as previously described had a solids content of 18% in N-methyl pyrrolidone and a Gardner-Holdt viscosity of X. The precursor solution was poured into methyl alcohol resulting in the precipitation of the precursor. The precipitated precursor was washed with additional methyl alcohol and dried under vacuum at 80°C. The isolated precursor was redissolved in N-methyl pyrrolidone. Surprisingly, the new solution at higher solids (20%) had a lower Gardner-Holdt viscosity (W), which indicates that solutions of a higher solids content can be prepared with the precursor than with the precursor prepared from a tetracarboxylic acid (see Ser. No. 363,771, filed May 24, 1973). A flexible film 1 to 2 mils thick was obtained by spreading the solution on a sheet and curing at 100°–200°C for about 30 minutes. This experiment was repeated with all of the formulations in Table II, and flexible films were obtained in every case except for the 80 mole % PMDA-20 mole % of DMPM formulation.

Apparently, precipitation and resolution remove some contaminants which interfere with film formation in the virgin material. Evaporation of the filtrate from the precursor isolation did provide a small amount of solid material. Washing this solid with water and subsequent evaporation provided another solid fraction. An infrared spectra for these fractions indicated the presence of acid (1700 cm$^{-1}$) and ester groups (1740 cm$^{-1}$) in the filtrate and ester amide or urea groups (1640 cm$^{-1}$) in the water wash, indicating that the contaminants are unreacted materials or low molecular weight products.

An infrared spectrum of the polyimide showed that it was a polyimide of the same structure as a polyimide prepared from pyromellitic dianhydride and 4,4-diaminodiphenyl methane.

EXAMPLE 2

6.54 gms (0.03 moles) Of PMDA and 5.64 gms (0.02 moles) of DMPM were dissolved in 104 gms of NMP at 30°–35°C. A clear, light amber colored solution was obtained. 5 drops of BDMA was then added and 12.5 gms (0.05 moles) of MDI was slowly added over a period of about 1 ½ hours. The temperature was maintained between 30°–35°C to control the rate of $CO_2$ evolution. As the reaction progressed the color of the reaction changed to cherry. After about 3 hours the viscosity of the reaction mixture began to rise and the temperature was gradually increased to 60°C. The reaction mixture was held at this temperature about 4 hours until the viscosity reached a maximum and $CO_2$ evolution ceased. The extremely viscous solution was diluted with 70 gms of NMP which gave a solids content of 11%. The Gardner viscosity was Y and the inherent viscosity 1.55 dl/g.

A portion of this reaction mixture was poured into methanol and the polymer precipitated. The yellow fibers were filtered, dried, and redissolved in NMP to give a 20% solids solution with an X Gardner viscosity. Films cast from this solution and cured to 200°C in an oven after a 30 minute period were creasable. Films cast from the non-precipitated solution and cured in the same manner were brittle and broke into pieces.

EXAMPLE 3

4.36 gms (0.02 moles) Of PMDA and 5.64 gms (0.02 moles) of DMPM were dissolved in 85 gms of NMP at 30°–35°C. A clear, light amber-colored solution was obtained. 5 drops of BDMA was then added and 10 gms (0.04 moles) of MDI was slowly added over a period of 1 ½ hours. The temperature of the reaction varied between 28°–35°C. After about 2 hours the viscosity of the mixture began to rise and became gelatinous in substance. The temperature was slowly increased to 60°C and maintained there until maximum viscosity was reached and $CO_2$ evolution ceased. The viscous solution was diluted with 22 gms of NMP to a solids content of 14.5%. Gardner viscosity = Z2$^+$. Inherent viscosity = 1.06 dl/g.

EXAMPLE 4

In a similar manner to Example 2 several reactions were run where the PMDA/DMPM ratio was varied from 40/60 to 80/20. In all cases except the 80/20 ratio the reaction proceeded as described in Example 2 and viscous solutions were obtained. In the reaction with the 80/20 ratio the mixture became cloudy and gelled.

EXAMPLE 5

6.54 gms (0.03 moles) Of PMDA and 7.32 gms (0.02 moles) of the dibutyl ester of PMDA were dissolved in 92 gms of NMP at 30°–35°C. 5 drops of BDMA were added and 12.5 gms (0.05 moles) of MDI was slowly added over 1 hour at a temperature between 30°–35°C. After about 3 hours the clear, cherry red solution began to increase in viscosity. 40 gms of NMP was added and the reaction continued at 30°–35°C for 3 hours. The highly viscous solution was slowly heated to 60°C until maximum viscosity was reached and $CO_2$ evolution ceased. Gardner viscosity = Z4.

EXAMPLE 6

9.66 gms (0.03 moles) Of BTDA and 7.72 gms (0.02 moles) of the dimethyl ester of BTDA are dissolved in 127 gms of NMP. 5 drops of BDMA are added and 12.5 gms (0.05 moles) of MDI are slowly added over a period of 1 ½ hours. The temperature is maintained at 30°–35°C to control the rate of $CO_2$ evolution. After the viscosity of the reaction mixture inreases the temperature is raised to 60°C where the reaction is continued until a maximum viscosity is reached and $CO_2$ evolution ceases.

EXAMPLE 7

6.36 gms (0.03 moles) Of THFDA and 5.52 gms (0.02 moles) of the dimethyl ester of THFDA are dissolved in 104 gms of NMP. Reaction is further carried out as described in Example 6.

EXAMPLE 8

BTDA and the dibutyl ester of BTDA were dissolved in NMP at 30°–35°C to form a clear, light amber solution of 18–19% solids (correcting for $CO_2$ evolved). 10 drops of BDMA was added and a stoichiometric amount of MDI was slowly added over a period of about 1½ hours. The temperature was maintained at about 90°C to control the rate of $CO_2$ evolution. As the reaction progressed the color of the reaction changed to dark red. After about 3 hours the viscosity of the reaction mixture began to rise; the temperature was maintained at 90°C. The reaction mixture was held at this temperature about 4 hours until the viscosity reached a maximum and $CO_2$ evolution ceased.

A portion of this reaction mixture was poured into methanol and the polymer precipitated. The yellow fibers were filtered, dried, and redissolved in NMP to give a 20% solids solution with an X Gardner viscosity. Films were cast from this solution and were cured at 200°C in a oven for 30 minutes. The films were creasable. Films cast from the non-precipitated solution and cured in the same manner were brittle and broke into pieces.

The following table gives the mole ratios used and the inherent viscosity of the precursor:

| BTDA (mole %) | Dibutyl ester of BTDA (mole %) | Inherent Viscosity ($\eta$) |
|---|---|---|
| 60 | 40 | Gel |
| 55 | 45 | 1.48 |
| 50 | 50 | 0.57 |

Due to the length of the ester chain BTDA at 60 mole % should be reacted at a lower temperature to avoid gelation.

EXAMPLE 9

The methyl ester of trimellitic acid was prepared by dissolving 192 g. of trimellitic anhydride in 500 ml. of absolute methanol. The reaction mixture was heated to reflux and held there for one hour. About 300 ml. of excess alcohol was then distilled off in vacuo and the reaction was cooled and filtered. A white powder was collected and dried. The equivalent weight was determined by acid titration to be about 115 (calculated = 112).

Example 8 was repeated with similar results using the above-prepared methyl ester of trimellitic anhydride.

The following table gives the mole ratios used and the inherent viscosity obtained.

| BTDA (mole %) | Methyl ester of TMA (mole %) | Inherent Viscosity ($\eta$) |
|---|---|---|
| 70 | 30 | 0.98 |
| 60 | 40 | 0.84 |
| 50 | 50 | 0.49 |

EXAMPLE 10

Example 8 was repeated except that the reaction tempratures were 30°, 60°, or 90°C and the methyl ester of TMA was used. All reactions were at 60 mole % BTDA-40 mole % methyl ester of TMA. The following table gives the reaction temperature and the inherent viscosity.

| Temperature (°C) | Inherent Viscosity ($\eta$) |
|---|---|
| 30 | 0.56 |
| 30 | 0.53 |
| 60 | 0.69 |
| 60 | 0.66 |
| 90 | 0.84 |
| 90 | 0.403 |

We claim:
1. A composition comprising a solution of:
A. about 30 to about 60 mole percent of an ester selected from the group consisting of
   1. mono-esters of tricarboxylic anhydride;
   2. diesters of a tetrocarboxylic acid where the ester groups are non-vicinal and each ester group is vicinal to a different carboxylic acid group; and
   3. mixtures thereof;
B. about 40 to about 70 mole percent of a dianhydride; and
C. an aromatic diisocyanate in an amount within 5 mole percent of stoichiometric.

2. A composition according to claim 1 wherein said dianhydride is aromatic.

3. A composition according to claim 2 wherein said dianhydride is pyromellitic dianhydride.

4. A composition according to claim 1 wherein the amount of said aromatic diisocyanate is stoichiometric.

5. A composition according to claim 1 wherein said diisocyanate is selected from the group consisting of p,p'-diisocyanatodiphenylether, p,p'-diisocyanatodiphenylmethane, and mixtures thereof.

6. A composition according to claim 1 wherein said ester groups are alkyl from $C_1$ to $C_4$.

7. A composition according to claim 1 wherein the amount of the solvent forming said folution is about 2 to about 5 times the weight of said dianhydride.

8. A composition according to claim 1 wherein said solution is at about 5 to about 25% solids.

9. A composition according to claim 1 wherein the solvent for said solution is N-methyl pyrrolidone.

10. A composition according to claim 1 wherein said ester is an ester of trimellitic anhydride.

11. A composition according to Claim 1 wherein said ester is an ester of pyromellitic dianhydride.

12. The uncured reaction product of
A. about 30 to about 30 mole percent of an ester selected from the group consisting of
   1. monoesters of a tricarboxylic anhydride;
   2. diesters of a tetracarboxylic acid, where the ester groups are non-vicinal and each ester group is vicinal to a different carboxylic acid group; and
   3. mixtures thereof;
B. about 40 to about 70 mole percent of a dianhydride; and
C. an aromatic diisocyanate in an amount within about 5 mole percent of stoichiometric.

13. A method of making a polyimide precursor comprising:
1. preparing a solution of
   A. about 30 to about 60 mole percent of an ester selected from the group consisting of
      i. monoesters of a tricarboxylic anhydride;
      ii. diesters of a tetracarboxylic acid, where the ester groups are non-vicinal and each ester group is vicinal to a different carboxylic acid group; and
      iii. mixtures thereof; B. about 40 to about 70 mole percent of a dianhydride;

2. adding to said solution an aromatic diisocyanate in an amount within about 5 mole percent of stoichiometric; and
3. heating said solution.

14. A method according to claim 13 including the additional final steps of:
1. adding a non-solvent to said solution to cause said precursor to precipitate
2. collecting said precipitated precursor; and
3. re-dissolving said collected precipitated precursor in a precursor solvent.

15. A method according to claim 14 wherein the amount of said non-solvent is about 10 to about 100% by volume of the volume of said admixture, and the amount of said precursor solvent is sufficient to make a solution of about 70 to about 82% solvent and about 18 to about 30% precursor.

16. A method according to claim 14 including the additional final steps making a polyimide from said polyimide precursor by
1. applying the solution of the precursor to a surface;
2. heating said solution to evaporate said solvent and to cure said precursor.

17. A method according to claim 16 wherein said surface is a flat, horizontal sheet and said polyimide is in the form of a film.

18. A method according to claim 16 wherein said surface is a wire and said polyimide forms an enamel on said wire.

19. A method according to claim 16 wherein:
said heating is done at about 275° to about 300°C for about 30 to about 45 minutes.

20. An uncured reaction product according to claim 12 wherein said dianhydride is aromatic.

21. An uncured reaction production according to claim 20 wherein said dianhydride is pyromellitic dianhydride.

22. An uncured reaction product according to claim 12 wherein the amount of said aromatic diisocyanate is stoichiometric.

23. An uncured reaction product according to claim 12 wherein said diisocyanate is selected from the group consisting of p,p'-diisocyanatodiphenylether, p,p'-diisocyanatodiphenylmethane, and mixtures thereof.

24. An uncured reaction product according to claim 12 wherein said ester groups are alkyl from $C_1$ to $C_4$.

25. An uncured reaction product according to claim 1 wherein said ester is aromatic.

26. An uncured reaction product according to claim 25 wherein said ester is an ester of trimellitic anhydride.

27. An uncured reaction product according to claim 12 wherein said ester is an ester of pyromellitic dianhydride.

28. A composition according to claim 1 wherein said ester is aromatic.

* * * * *